(12) United States Patent
Lara et al.

(10) Patent No.: US 11,869,046 B2
(45) Date of Patent: Jan. 9, 2024

(54) CROWD-SOURCED ACTIVITY PROCESSING

(71) Applicant: NCR Voyix Corporation, Atlanta, GA (US)

(72) Inventors: Arnold Bacalla Lara, Mandaue (PH); Melvin Gellecania Bacus, Cebu (PH); Alain Rex Mata Banilad, Naga (PH); Mayla Venessa Juab Capin, Oroquieta (PH); Hard Harry Soterol Nadela, Carcar (PH); Gilbert Grafia Tumulak, Jr., Lapu-Lapu (PH)

(73) Assignee: NCR Voyix Corporation, Atlanta, GA (US)

(*) Notice: Subject to any disclaimer, the term of this patent is extended or adjusted under 35 U.S.C. 154(b) by 0 days.

(21) Appl. No.: 17/966,432

(22) Filed: Oct. 14, 2022

(65) Prior Publication Data
US 2023/0031628 A1 Feb. 2, 2023

Related U.S. Application Data

(62) Division of application No. 17/080,936, filed on Oct. 27, 2020.

(51) Int. Cl.
| | |
|---|---|
| G06Q 10/00 | (2023.01) |
| G06Q 30/0279 | (2023.01) |
| G06F 16/9536 | (2019.01) |
| G06Q 50/00 | (2012.01) |
| G06Q 30/0204 | (2023.01) |

(Continued)

(52) U.S. Cl.
CPC ..... *G06Q 30/0279* (2013.01); *G06F 16/9536* (2019.01); *G06Q 10/0838* (2013.01); *G06Q 20/12* (2013.01); *G06Q 20/384* (2020.05); *G06Q 30/0205* (2013.01); *G06Q 30/0637* (2013.01); *G06Q 50/01* (2013.01); *H04W 4/021* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 9,712,576 B1* | 7/2017 | Gill | G06N 5/04 |
| 9,865,013 B1* | 1/2018 | Tsing | G06Q 30/0631 |

(Continued)

OTHER PUBLICATIONS

A Devari, AG Nikolaev, Q He "Crowdsourcing the last mile delivery of online orders by exploiting the social networks of retail store customers," Part E: Logistics and Transportation Review, 2017—Elsevier (hereinafter He et al.). (Year: 2017).*

*Primary Examiner* — Hafiz A Kassim
(74) *Attorney, Agent, or Firm* — Schwegman Lundberg & Woessner, P.A.

(57) ABSTRACT

Users form custom-defined communities for performing a defined activity amongst themselves. An actor defines the activity and restrictions associated with the activity. Members of the community place requests for the actor to perform member-specific actions during the activity on behalf of the members. The actor performs the activity with the member-specific actions and arranges procurement of results associated with each of the members. The actor and the members may also settle up with one another at least upon procurement. The activity is crowd sourced within the custom-defined community, thereby reducing the need for the members to each individually perform the activity.

7 Claims, 3 Drawing Sheets

(51) Int. Cl.
*H04W 4/02* (2018.01)
*G06Q 10/083* (2023.01)
*G06Q 20/12* (2012.01)
*G06Q 20/38* (2012.01)
*H04W 4/021* (2018.01)
*G06Q 30/0601* (2023.01)

(56) References Cited

U.S. PATENT DOCUMENTS

| | | | |
|---|---|---|---|
| 10,657,486 B1* | 5/2020 | Wolter | G06Q 10/0833 |
| 11,195,169 B1* | 12/2021 | Hartman | G06Q 20/326 |
| 11,423,491 B1* | 8/2022 | O'Connor | G06Q 20/0855 |
| 2004/0068443 A1* | 4/2004 | Hopson | G06Q 10/08 |
| | | | 705/5 |
| 2011/0093361 A1* | 4/2011 | Morales | G06Q 30/0603 |
| | | | 705/26.62 |
| 2013/0185195 A1* | 7/2013 | Hull | H04L 67/55 |
| | | | 705/39 |
| 2014/0066044 A1* | 3/2014 | Ramnani | H04L 67/306 |
| | | | 455/418 |
| 2014/0278850 A1* | 9/2014 | Boccuzzi, Jr. | G06Q 30/0208 |
| | | | 705/14.11 |
| 2014/0279098 A1* | 9/2014 | Ham | G06Q 20/102 |
| | | | 705/16 |
| 2016/0140632 A1* | 5/2016 | Kandala | G06Q 30/0603 |
| | | | 705/26.61 |
| 2018/0114262 A1* | 4/2018 | Sanjeevaiah Krishnaiah | |
| | | | G06Q 30/0631 |
| 2019/0050923 A1* | 2/2019 | Sundaresan | G06Q 10/10 |
| 2020/0234380 A1* | 7/2020 | Dulori | G06Q 40/08 |
| 2020/0265458 A1* | 8/2020 | Esecson | G06Q 30/0238 |

\* cited by examiner

CROWD-SOURCED ACTIVITY PROCESSING

CROSS-REFERENCE TO RELATED APPLICATION

This application is a division of U.S. patent application Ser. No. 17/080,936, filed Oct. 27, 2020, which application and publication is incorporated herein by reference in its entirety.

BACKGROUND

The COVID19 pandemic has changed many retail-based business practices based on current public health directives. Governments are now advising citizens to minimize virus exposure times by staying at home as much as possible and only leaving home for necessities while wearing masks and observing social distancing rules. Yet, retailers have designed store layouts, checkout systems, advertising, and product shelf placement to encourage customers to stay within their stores for as long as possible.

Now retailers are attempting to institute practices that reduce in-store customer traffic and that attempt to reduce the time that customers remain in their store when purchasing essentials.

Few if any governments could implement complete stay-at-home orders where those governments deliver necessities to their citizens. In fact, achieving this is inconceivable and no government is even attempting to achieve such a feat. Rather, governments allow their citizens to leave their home to purchase and obtain their own essential items.

As a result, high-risk and elderly individuals who are most susceptible to hospitalization and death from catching the virus have few options but to venture out for essentials during the pandemic. Furthermore, some individuals that are not at high-risk are also concerned with venturing out for essentials out of fear that they may bring the virus back into their homes and give the virus to a loved one that is in the high-risk category.

These fears have also induced product hoarding by consumers, resulting in many popular items being out-of-stock for long periods of time. Lack of product inventories have further caused individuals to go to the store more frequently than they would have gone pre-pandemic in search of their needed products.

SUMMARY

In various embodiments, methods and a system for crowd-sourced activity processing are presented.

According to an aspect, a method crowd-sourced activity processing is presented. For example, an activity for an actor is defined and a customized community for the activity is determined. The activity is posted within the customized community of members and select members accepted for the activity are identified along with a set of actions requested by each select member. Procurement of results associated with completion of the activity and completion of each set of actions are arranged between the actor and the select members.

DETAILED DESCRIPTION

Figure 1:
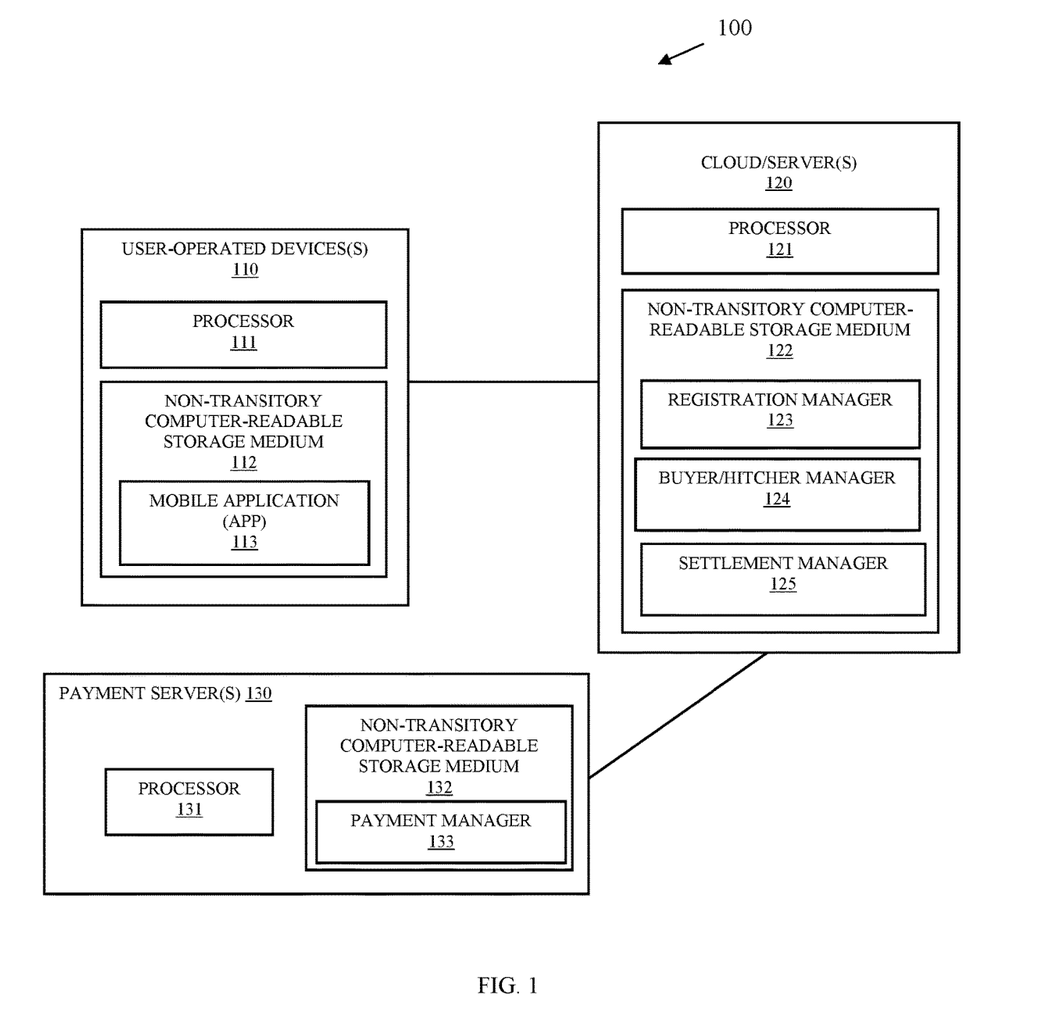
FIG. 1 is a diagram of a system for crowd-sourced activity processing, according to an example embodiment.

FIG. 1 is a diagram of a system 100 for crowd-sourced activity processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of crowd-sourced activity processing presented herein and below.

As will be discussed more completely herein and below, system 100 provides a platform, devices, and executable instructions that permit a user to announce that the user is going to perform an activity to other user's of a community defined by the user. The community users may then request that the announcing user perform some additional activities on behalf of the requesting users.

One activity that is of particular interest during COVID19 is grocery shopping. A user that has a planned grocery trip can assist his neighbors and friends by obtaining grocery items for them during the user's planned trip. This limits virus exposure, complies with existing governmental regulations, and involves little additional effort by the user with the planned trip to the grocery store. Planned activities of members of the community can be leveraged to the benefit of the community as whole by crowd sourcing the activity.

Existing gig economy-based applications require each user to make individual and unrelated orders that are picked at a designated grocery store and delivered to the requesting users. These orders are largely not aggregated for multiple different user requests into a single order or trip, are not based on a planned shopping trip of the person that fulfills the order and are not based on a customized community of members that know and trust one another. Rather, the individual that fulfills the order for the requesting consumer is disinterested in the requesting consumer, unknown to the consumer, unaccountable to consumer, and unfamiliar with the consumer.

As used herein, there are two types of users: 1) an "actor" (may also be referred to as a "buyer") who broadcasts a custom community intention to perform a given activity/action and 2) a "hitcher" who receives the broadcasted community intention and elects to request that the actor/buyer perform additional actions/activities on behalf of the hitcher. Any given user can be an actor for one activity while being a hitcher for another different activity. In other words, the designation of actor/buyer and hitcher changes based on whether the user is broadcasting an intention to perform an activity (actor/buyer) or whether the user is receiving an intention within the customized community (hitcher).

System 100 comprises a plurality of user-operated devices 110, one or more clouds/servers 120, and one or more payment servers 130 (payment servers 130 are optional).

Each user-operated device 110 comprises a processor 111 and a non-transitory computer-readable storage medium 112 having executable instructions comprising a mobile application (app) 113.

Each cloud/server 120 comprises a processor 121 and a non-transitory computer-readable storage medium 122.

Medium 122 comprises executable instructions for a registration manager 123, buyer/hitcher manager 124, and a settlement manager 125.

Each payment server 130 comprises a processor 131 and a non-transitory computer-readable storage medium 132. Medium 132 comprises executable instructions for a payment manager 133.

Each processor (111, 121, and 131) when provided the corresponding executable instructions from the corresponding medium (112, 122, and 132) causes that processor (111, 121, and 131) to perform operations associated with the corresponding (113, 123-125, and 133), as discussed below with respect to app 113, registration manager 123, buyer/hitcher manager 124, settlement manager 125, and payment manager 133.

Users initially obtain app 113 on their devices 110. This can be downloaded from an app store or this may be obtained by a Uniform Resource Locator (URL) through a web browser (in which case app 113 is delivered through web pages within a browser on user devices 1110).

On first user, a user is interacted with through a user-facing interface of app 113 with registration manager 123 to create an account. A variety of information can be collected for the user during registration by registration manager 123 and stored in a profile linked to the user account. The profile comprises a variety of information, such as and by way of example only: mobile phone number, email address, home address, payment cards, payment methods (PayPal®, Venmo®, etc.), preferred or frequented stores of the user, preferred shopping items, preferred brands, preferred shopping list of items frequently purchased by the user, preferred method of delivering items to community hitchers (deliver to the homes of the hitchers or deliver through pickup at a designated location), preferred location for pick up of items belonging to community hitchers (user's home, parking lot of grocery store, etc.), preferred method of settlement with community members (cash on pickup, payment card, payment method), preferred timing of settlement (before delivery/pickup or upon delivery/pickup), preferred distance that the user is willing to travel when delivering hitcher items to the hitchers from the user's home (e.g., 2 miles, 5 miles, 10 miles, etc.), preferred distance that the user is willing to travel from home when picking up items requested by the user as a hitcher, any preferred fee for purchasing and/or delivering items to community hitchers, maximum amount of fee (percentage of total or set dollar amount) user is willing to pay for picking up or having items delivered when the user is a hitcher, geographical range from user's home that may be used to define a dynamic community defined based on the geographic range (e.g., 2 mile radius, 5 mile radius, etc.), a maximum number of community members that are permitted to hitch onto a buying trip initiated by the user (e.g., 3, 5, 10, etc.), a maximum dollar amount for any given purchase permitted by a hitcher that hitches onto the user's buying trip, a maximum number of items that a hitcher is permitted to request during the user's buying trip, items that the user will not buy for any hitcher during a buying trip (e.g., alcohol, tobacco, etc.), etc.

The profile is linked to the user's account and managed by registration manager 123. Moreover, user-facing interface of app 113 may permit items of the profile to be changed (changing default values to other default values which are initially set for all buying activities or hitching requests by the user) or changed dynamically for any given buying trip (activity) initiated or hitching request associated with the user.

Buyer/Hitcher manager 124 permits a "community" to be defined in a variety of manners, which are defined by the user or dynamically defined (when permitted by the user). User-facing interface of app 113 interacts with buyer/hitcher manager 124 to set a community for a given action (e.g., trip to a store). The user may select from member names/identifiers to exclude from the community or to specifically include in the community (prohibited member list or allowed member list). In some cases, the user permits buyer/hitcher manager 124 to dynamically set the community based on geographic restrictions from the user's home address or the store address for a given trip.

An initiating user declares an intended action/trip through user-facing interface of app 113 with default set (set from profile) trip options or trip restrictions or with dynamically overridden trip options, which are overridden by the initiating user through the user-facing interface. The action/trip intention identifies action/trip details, such as and by way of example only: initiating user's community name/identifier, store name, store visit calendar date, store location/address, store time of day for the visit, maximum number of hitchers that will be accepted for the trip, maximum number of items that are permitted to be requested by each hitcher, prohibited items that are not permitted to be requested by any hitcher, maximum dollar amount for a given order of any hitcher, whether delivery to the hitcher's home is permitted, pickup location if pickup is available or mandated by the initiating user, available methods of settlement, timing of settlement, any geographic range restrictions that each hitcher must be within (such as within 2 miles of initiating user's home address or the store address), any fee associated with fulling a hitcher's order, any fee associated with delivering a hitcher's order to a hitcher designated location, etc.

Once an action/trip request with the action/trip details are set, the user may set members/hitchers to receive the request or may allow buyer/hitcher manager 124 to dynamically define the community. The user-facing interface of app 113 then allows the user to post the action/trip request to the custom community. Any members defined within the custom community, then receive a push notification in their account from buyer/hitcher manager 124 with the action/trip request and with the action/trip details. Buyer/hitcher manager 124 may identify action/trip details in the action/trip request that conflict with any given receiving hitcher's profile settings and highlight such restrictions within the user-facing interface of app 113 requesting that the hitcher agree or disagree with the conflicting restrictions before proceeding. A given hitcher can then reply to the post with an order of items for the store associated with the action/trip post.

The initiating or posting user may require that he/she affirmatively accept any giving hitcher order or may allow the hitching order to be automatically accepted by buyer/hitcher manager 125 as long as the order details comply with the action/trip details or restrictions (e.g., no prohibited items, under a maximum item count, and under a total order price, geographic restrictions, etc.). Buyer/Hitcher manager 124 also maintains a count of accepted hitchers for a given action/trip post and removes the post as soon as the maximum number of hitchers are accepted by the posting user.

In some cases, the buyer/hitcher manager 124 dynamically determines the community that receives the posting based on the action/trip details or restrictions (such as when the posting user authorized such dynamic determination). The action/trip details or restrictions are used to search and filter the registered users and to dynamically define the community that can see the post.

Buyer/Hitcher manager 124 may also utilize an Application Programming Interface (API) to access a catalogue of items of registered store locations along with item pricing and item details. So, when a member of the dynamically assembled or posting user-defined community receives the post, a link is accessed by the members within app 113 to search, view, browse, and navigate that store's catalogue of items. The member makes selections from the catalogue and a running total price for the order is displayed to the member. The member may confirm a basket or virtual cart before a reply is sent to the posting user with that member's order. Furthermore, buyer/hitcher manager 124 prohibits the member for exceeding any total order price or total number of items that do not comply with the action/trip details or restrictions.

In an embodiment, user-facing interface 113 permits a potential hitcher that exceeds a total order price or exceeds a total number of items for an order to send an in-app message through buyer/hitcher manager 124 make to the app 124 of the posting user requesting authorization by the posting user for any overage. As soon as the posting user authorizes, the hitching member is permitted to submit the order that exceeds the total order price or the total number of items for the order.

The posting user then visits the store at the designated location within the designated time of day and makes the purchases for the posting user and for all the accepted hitching orders. Next, the posting user delivers the individual orders to the accepted hitchers based on whether the orders are delivered to the hitchers or picked up by the hitchers at a designated location. Any orders that were not settled before pickup or deliver are settled upon delivery or pickup.

Settlement can be done by cash between the posting user and the hitchers, done through a payment method (PayPal®, Venmo®, etc.), or done through a payment card using app 113, which is processed by settlement manager 125 with a corresponding payment manager 133. Settlement manager 125 can receive card information through app 113 or based on a registered payment card selected by the hitcher from the hitcher's profile associated with the hitcher's account. Settlement manager 125 may also obtain and process any fees from a hitcher's payment to credit an account associated with the posting user (assuming fulfillment and/or delivery fees were part of the action/trip details or restrictions with the original action/trip request or post).

In an embodiment, settlement manager 125 may also collect fees during settlement for performing the settlement from the posting user (fulfillment user).

A "h itch" refers to an action/trip request or posting made by an initiating user. There are three types of hitches. One was discussed above as a future hitch with a planned date and time. A second type of hitch is an "immediate hitch" for which the posting is made when the initiating user is within a store or within a configured proximity of the store (app 113 sends location data for device 110, which is mapped to a known location for the store by buyer/hitcher manager 124). A third type of hitch is a "recurring hitch) for which a pattern of visits are determined automatically based on the posting or initiating user's shopping pattern (visits store X every Saturday).

The initiating user can set hitches to be sent as action/trip requests or posts automatically without user permission or only as specifically noted or confirmed by the initiating user. So, an initiating user may receive an in-app push notification from buyer/hitcher manager 125 when it is determined that device 110 is within a store or within a configured proximity of the store asking the user whether a hitch for this store should be posted or not. Similarly, a confirmation message is sent to the user just before a detected recurring store visit is anticipated to be visited by the user asking the user whether the user intends to visit store X on day Y and whether a hitch should be posted on the user's behalf.

In an embodiment, notifications or posting are made using an existing social media API, such as Facebook®. The user can also sign-in and register using the social media API. The notifications or postings may also appear in each registered user's social media-maintained timeline (such as Facebook's® timeline).

In an embodiment, a registered user that shops at a registered store may send a transaction receipt for a given transaction to buyer/hitcher manager 124 utilizing an API that provides a store customer identifier for the user to manager 124 along with transaction details of a transaction. Manager 124 maintains linkage to the registered user's account with the store customer identifier and identifies the transaction as being associated with an action/trip request or posting of the user. Each hitcher's order items are separated into a separate receipt for the corresponding hitcher and provided through app 113 to the buying/initiating user and each separated hitcher order receipt sent through app 113 to the corresponding hitcher.

In an embodiment, app 113 permits the posting/fulfilling/buying user to take a photograph or multiple photographs for a given transaction of the buying user associated with a given posting. App 113 sends the image or images associated with the transaction receipt to manager 124. Manager 124 performs Optical Character Recognition (OCR) on the image(s) and separates out each individual order for each hitcher associated with the trip or posting. Each hitcher receives his/her receipt and buyer/poster receives all separated hitcher orders along with details for the hitcher to which each separated order applies.

In an embodiment, manager 124 maintains a history of trips, fees, and hitching orders for each user (for transactions where the user is a buyer and for transactions where the user is a hitcher). Manager 124 may also allow users to search and mine the history through a user-facing interface of app 113.

In an embodiment, app 113 permits a real-time map to be displayed within the user-facing interface indicating where the buyer is presently located relative to an agreed pickup location with the hitchers or relative to a hitcher's home address. In this embodiment, the real-time map is only available to hitchers when the buyer indicates he is delivering the hitcher's order.

In an embodiment, manager 124 sends a dynamic push notification to the hitcher's apps 113 when the buyer is detected within the store associated with a posting alerting the hitchers that the buyer is now at the store to fulfill the hitcher's order.

In an embodiment, buyer/hitcher manager 124 permits buyer and hitcher ratings and a rating or reputation score as well as comments to be maintained with each user. It is noted that a single user can have two separate ratings and scores, one for a buyer and one for a hitcher.

In an embodiment, a Point-Of-Sale (POS) API permits a POS terminal or Self-Service Terminal (SST) to interact with device 110 and receive a token provided by manager 124. The POS terminal or SST then interacts through another API with manager 124 to obtain hitcher orders associated with the buyers transaction and hitcher payment details registered for each hitcher. POS terminal or SST then generates and processes each separate hitching order from that of the buyer and generates individual order receipts that are sent to the buyer and to each hitcher's device 110. Here, the POS terminal or SST performs payment processing for a single order as separated orders based on interaction with manager 124 using the token and hitcher details.

In an embodiment, device 110 can be a desktop computer, a wearable processing device, a phone, a table, or a laptop.

One now appreciates how consumers can dynamically form customized communities to crowd source an action of an actor (such as grocery shopping associated with a grocery store visit). Users can be buyers or actors for some crowd-sourced actions and hitchers for other actions. This allows consumers to assist their friends, families, and neighbors for activities that the consumers were going to perform for themselves anyway, and if desired the consumers can also earn some money at the same time. The crowd-sourced activity system 120 also reduces COVID19 exposures by reducing customer traffic and stores while at the same time potentially increasing store revenues since some consumers that would not visit the stores during the pandemic now have a means for purchase store items without exposure to COVID19. Consumers only form communities for a given activity with consumer-defined selections or requirements, which ensures that the consumers trust and likely know one another, which makes the activity personal for all parties involved and increases the likelihood of widespread adoption.

These and other embodiments are now discussed with reference to FIGS. 2-3.

Figure 2:
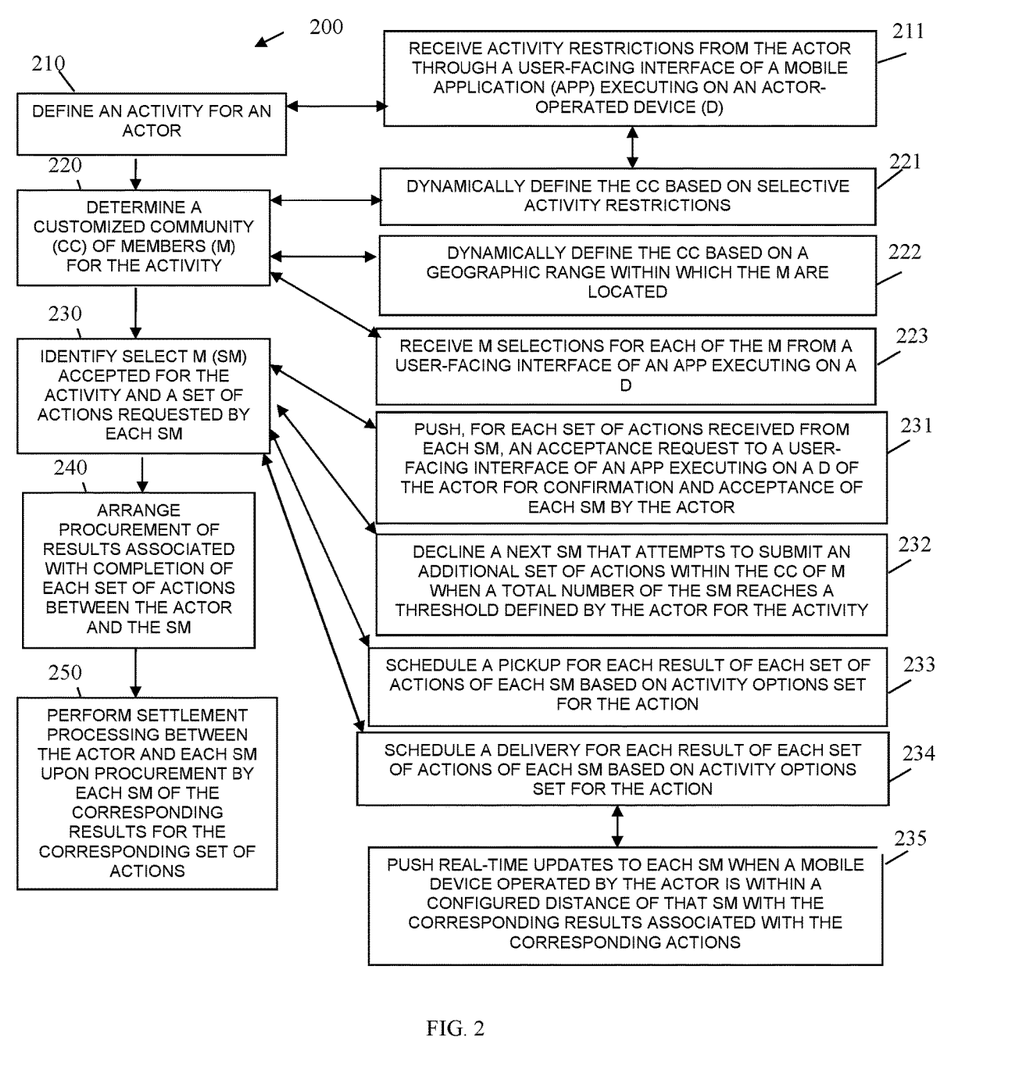
FIG. 2 is a diagram of a method for crowd-sourced activity processing, according to an example embodiment.

FIG. 2 is a diagram of a method 200 for crowd-sourced activity, according to an example embodiment. The software module(s) that implements the method 200 is referred to as a "crowd-source activity manager." The crowd-source activity manager is implemented as executable instructions programmed and residing within memory and/or a non-transitory computer-readable (processor-readable) storage medium and executed by one or more processors of a device. The processor(s) of the device that executes the crowd-source activity manager are specifically configured and programmed to process the crowd-source activity manager. The crowd-source activity manager has access to one or more network connections during its processing. The network connections can be wired, wireless, or a combination of wired and wireless.

In an embodiment, the device that executes the crowd-source activity manager is server 120. In an embodiment, the server 120 is a cloud processing environment that comprises multiple servers cooperating with one another as a single server 120.

In an embodiment, the crowd-source activity manager is all of or some combination of 123-125.

In an embodiment, the crowd-source activity manager performs the processing discussed above with system 100.

In an embodiment, the crowd-source activity manager provides and manages a crowd-sourced social media platform. In an embodiment, the crowd-sourced social media platform is provided within an existing social media platform as a service of that existing social media platform and as an enhancement to that existing social media platform.

At 210, the crowd-source activity manager defines an activity for an actor. In an embodiment, the activity is a shopping trip (such as a visit to a retailer or a grocery store). In an embodiment, the activity is picking up items previously ordered or set aside for multiple individuals.

In an embodiment, at 211, the crowd-source activity manager receives activity restrictions from the actor through a user-facing interface of a mobile application executing on an actor-operated device. In an embodiment, the mobile application is app 113 and the actor-operated device is device 110. In an embodiment, app 113 is provides via web pages within a browser that executes on device 110.

At 220, the crowd-source activity manager determines a customized community of members from the activity.

In an embodiment of 211 and 220, at 221, the crowd-source activity manager dynamically defines the customized community of members based on selective activity restrictions set dynamically by the actor through the user-facing interface and/or set based on a registered profile associated with the actor.

In an embodiment, at 222, the crowd-source activity manager dynamically defines the customized community based on a geographic range within which the members are located (mobile apps report location information for the members' mobile devices) or have home addresses defined in profiles for the memory that are located within the geographic range. The geographic range can be dynamically defined based on a source location where the activity is to be performed by the actor or based on a home address of the actor.

In an embodiment, at 223, the crowd-source activity manager receive member selections for each of the members from a user-facing interface of an app that executes on an actor-operated device. Here, the actor selects the members for the activity.

At 230, the crowd-source activity manager identifies select members from the members that are accepted for the activity and a set of actions that are being requested by each select member. Here, the select members make requests, which are accepted, within the customized community for the actor to perform the requested actions on behalf of the corresponding select members when the actor performs the activity at an activity location (e.g., such as a grocery store).

In an embodiment, at 231, the crowd-source activity manager pushes, for each set of actions received from each select member, an acceptance request to a user-facing interface of a mobile application executing on an actor-operated device for confirmation and acceptance of each select member by the actor.

In an embodiment, at 232, the crowd-source activity manager declines a next select member that attempts to submit an additional set of actions within the customized community of the members when a total number of select members reaches a threshold defined by the actor for the activity.

In an embodiment, at 233, the crowd-source activity manager schedules a pickup for each result of each set of actions of each select member based on activity options set for the action.

In an embodiment, at 234, the crowd-source activity manager schedules a delivery for each result of each set of actions of each select member based on activity options set for the action.

In an embodiment of 234 and at 235, the crowd-source activity manager pushes real-time updates to each select member when a mobile device operated by the actor is within a configured distance of that select member with the corresponding results associated with performance by the actor of the corresponding actions.

At 240, the crowd-source activity manager arranges procurement of results associated with completion of each set of actions between the actor and the select members.

In an embodiment, at 250, the crowd-source activity manager performs settlement processing between the actor, and each select member upon procurement by each select member of the corresponding results for the corresponding set of actions.

Figure 3:
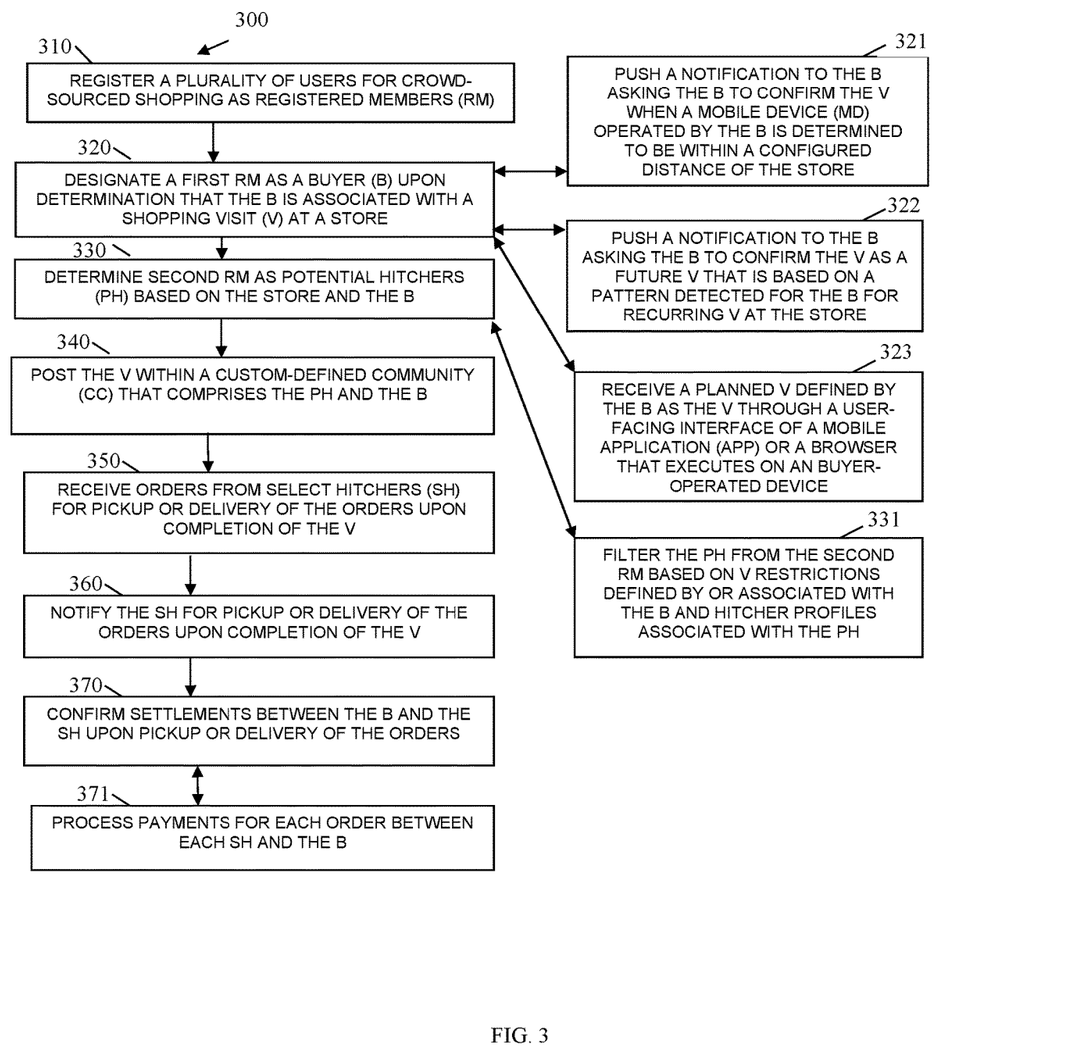
FIG. 3 is a diagram of another method for crowd-sourced activity processing, according to an example embodiment.

FIG. 3 is a diagram of another method 300 for crowd-sourced activity, according to an example embodiment. The software module(s) that implements the method 300 is referred to as a "crowd-sourced shopping visit manager." The crowd-sourced shopping visit manager is implemented as executable instructions programmed and residing within memory and/or a non-transitory computer-readable (processor-readable) storage medium and executed by one or more processors of a device. The processors that execute the crowd-sourced shopping visit manager are specifically configured and programmed to process the crowd-sourced shopping visit manager. The crowd-sourced shopping visit manager has access to one or more network connections during its processing. The network connections can be wired, wireless, or a combination of wired and wireless.

In an embodiment, the device that executes the crowd-sourced shopping visit manager is server 120. In an embodiment, the server 120 is a cloud processing environment that comprises multiple servers cooperating with one another as a single server 120.

In an embodiment, the crowd-sourced shopping visit manager is all or some combination of 123-125, and/or the method 200.

In an embodiment, the crowd-sourced shopping visit manager provides and manages a crowd-sourced shopping social media platform. In an embodiment, the crowd-sourced shopping social media platform is provided within an existing social media platform as a service of that existing social media platform and as an enhancement to that existing social media platform The crowd-sourced shopping visit manager presents another and, in some ways, enhanced processing perspective to that which was described above with the FIG. 2.

At 310, the crowd-sourced shopping visit manager registers a plurality of users for crowd-sources shopping as registered members.

At 320, the crowd-sourced shopping visit manager designates a first registered member as a buyer upon determination that the buyer is associated with a shopping visit at a store.

In an embodiment, at 321, the crowd-sourced shopping visit manager pushes a notification to the buyer asking the buyer to confirm the shopping visit when a mobile device operated by the buyer is determined to be within a configured distance of the store.

In an embodiment, at 322, the crowd-sourced shopping visit manager pushes a notification to the buyer asking the buyer to confirm the shopping visit as a future shopping visit that is based on a shopping pattern detected for the buyer for recurring shopping visits at the store.

In an embodiment, at 323, the crowd-sourced shopping visit manager receives a planned shopping visit defined by the buyer as the shopping visit through a user-facing interface of a mobile application or a browser that executes on a buyer-operated device.

At 330, the crowd-sourced shopping visit manager determines second registered members as potential hitchers based on the store and the buyer.

In an embodiment, at 331, the crowd-sourced shopping visit manager filters the potential hitchers from the second registered members based on shopping visit restrictions defined by or associated with the buyer and hitcher profiles associated with the potential hitchers.

At 340, the crowd-sourced shopping visit manager posts the shopping visit within a custom-defined community that comprises the potential hitchers and the buyer.

At 350, the crowd-sourced shopping visit manager receives orders from select hitchers for pickup or delivery of the orders upon completion of the shopping visit by the buyer.

At 360, the crowd-sourced shopping visit manager notifies the select hitchers for pickup or delivery of the orders upon completion of the shopping visit by the buyer at the store.

At 370, the crowd-sourced shopping visit manager confirms settlements between the buyer and each of the select hitchers upon pickup or delivery of the orders.

In an embodiment, at 371, the crowd-sourced shopping visit manager processes payments for each order between each of the select hitchers and the buyer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
providing, by a cloud server, a crowd-sourced shopping social media platform as a service that is available to users through user interfaces of mobile applications or browsers on user-operated devices;
registering, by the cloud server, the users for access to the crowd-sourced shopping social media platform;
receiving, by the cloud server, a shopping activity defined by a first user through a first user interface to the crowd-sourced shopping social media platform;
defining, by the cloud server, a customized community for participation in the shopping activity;
receiving, by the cloud server, orders from second users through the second user interfaces, wherein receiving the orders further includes limiting a total purchase amount each order that is permissible based on shopping visit restrictions defined by the first user for the shopping activity;

providing, by the cloud server, the orders of the second users to the first user;

facilitating, by the cloud server, payments and deliveries associated with the orders to the first user through the customized community of the crowd-sourced shopping social media platform when the first user completes the shopping activity at a store, wherein facilitating further includes receiving, by the cloud server, a transaction receipt from the first user through the first user interface, obtaining, by the cloud server, a customer identifier from the transaction receipt for the first user, linking, by the cloud server, the orders for the shopping activity to the first user based on the customer identifier, generating, by the cloud server, a separate receipt for each second user based on the corresponding order associated with the corresponding second user, providing, by the cloud server, the separate receipts to the first user through the first user interface, and providing, by the cloud server, each separate receipt to the corresponding second user through the corresponding second user interface; and delivering, by the cloud server, a token defining each second user's order to a terminal associated with the store causing the terminal to send an individualized receipt to each second user based on the corresponding order when the first user pays for a single aggregated order that includes a first user's order and the orders from the second users at the terminal of the store.

2. The method of claim 1, wherein providing the crowd-sourced shopping social media platform further includes providing the service as an integrated service of an existing social media platform.

3. The method of claim 1, wherein receiving the orders further includes obtaining a confirmation acceptance from the first user for each order.

4. The method of claim 1, wherein receiving the orders further includes limiting a total number of the second users based on a threshold defined by the first user for the shopping activity.

5. The method of claim 1, wherein providing the orders further includes setting conditions for the orders through feedback of the second users and the first user interacting through the first user interface and the second user interfaces on the crowd-sourced shopping social media platform.

6. A system, comprising:
a cloud server that comprises a processor; and
the processor executes instructions that cause the processor to perform operations comprising:
providing a crowd-sourced shopping social media platform as a service that is available to users through an existing social media platform through an application programming interface (API);

registering first users through a first user interface activated by the API on first user operated devices;

interacting with a certain first user to defining a shopping activity planned by the certain first user through the first user interface;

permitting other second users to hitch onto the shopping activity of the certain first user and provide orders for the shopping activity through second user interfaces activated by the API on second user operated devices, wherein permitting further includes further includes limiting a total purchase amount each order that is permissible based on shopping visit restrictions defined by the certain first user for the shopping activity;

facilitating payments and deliveries of the orders through the crowd-sourced shopping social media platform to the other second users when the certain first user completes the shopping activity at a store based on the crow-sourced social media platform detecting the certain first use completed the shopping activity, wherein facilitating further includes receiving a transaction receipt from the certain first user through the first user interface, obtaining, a customer identifier from the transaction receipt for the certain first user, linking the orders for the shopping activity to the certain first user based on the customer identifier, generating a separate receipt for each second user based on the corresponding order associated with the corresponding second user, providing the separate receipts to the certain first user through the first user interface, and providing each separate receipt to the corresponding second user through the corresponding second user interface; and delivering a token defining each second user's order to a terminal associated with the store causing the terminal to send an individualized receipt to each second user based on the corresponding order when the certain first user pays for a single aggregated order that includes a certain user's order and the orders from the second users at the terminal of the store.

7. The system of claim 6, wherein the operations associated with permitting further include enforcing shopping visit restrictions or a threshold defined by the certain first user for the orders of the crowd-sourced shopping social media platform with the other second users before accepting the corresponding orders for the shopping activity.

* * * * *